Figure 1:
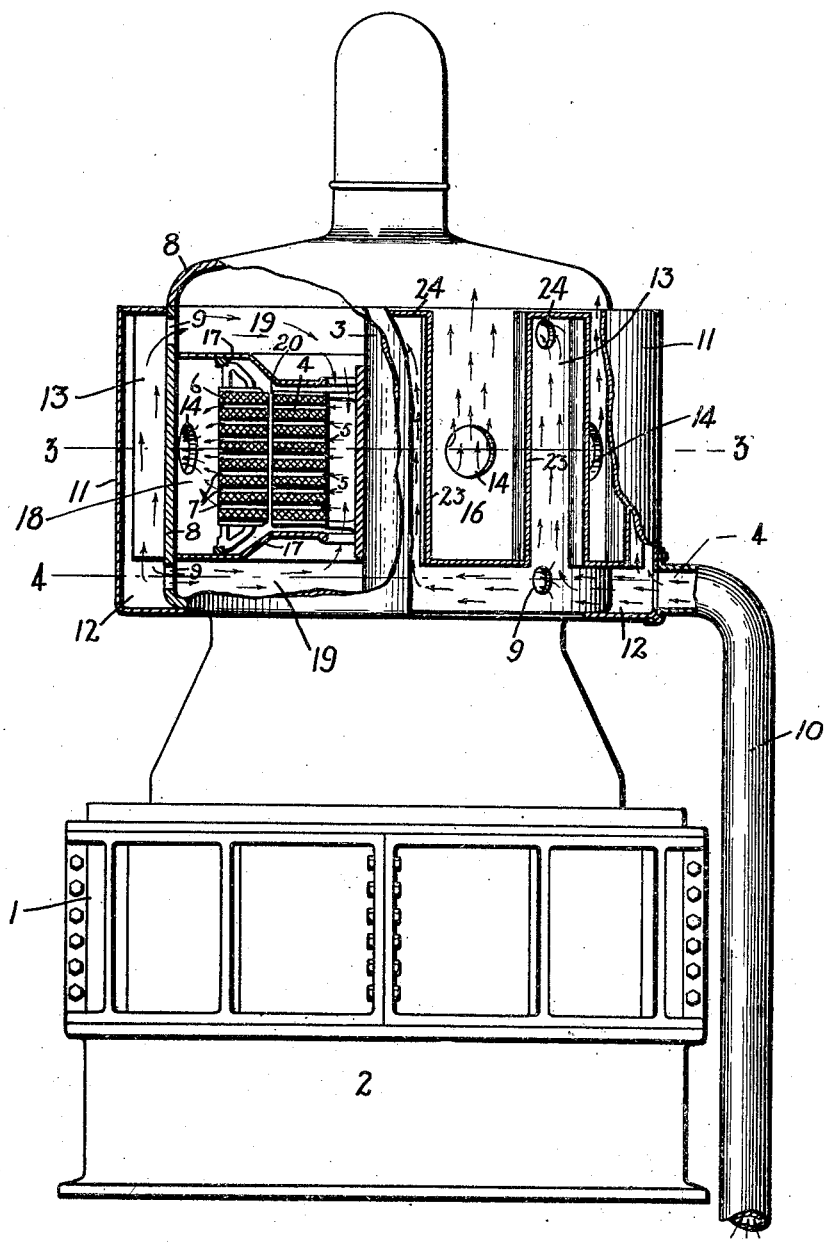

No. 895,894. PATENTED AUG. 11, 1908.
R. H. RICE.
MEANS FOR COOLING DYNAMO ELECTRIC MACHINES.
APPLICATION FILED NOV. 2, 1907.

3 SHEETS—SHEET 1.

Witnesses;
Lloyd C. Bush
J. Ellis Glen

Inventor,
Richard H. Rice,
By Albert G. Davis
Att'y

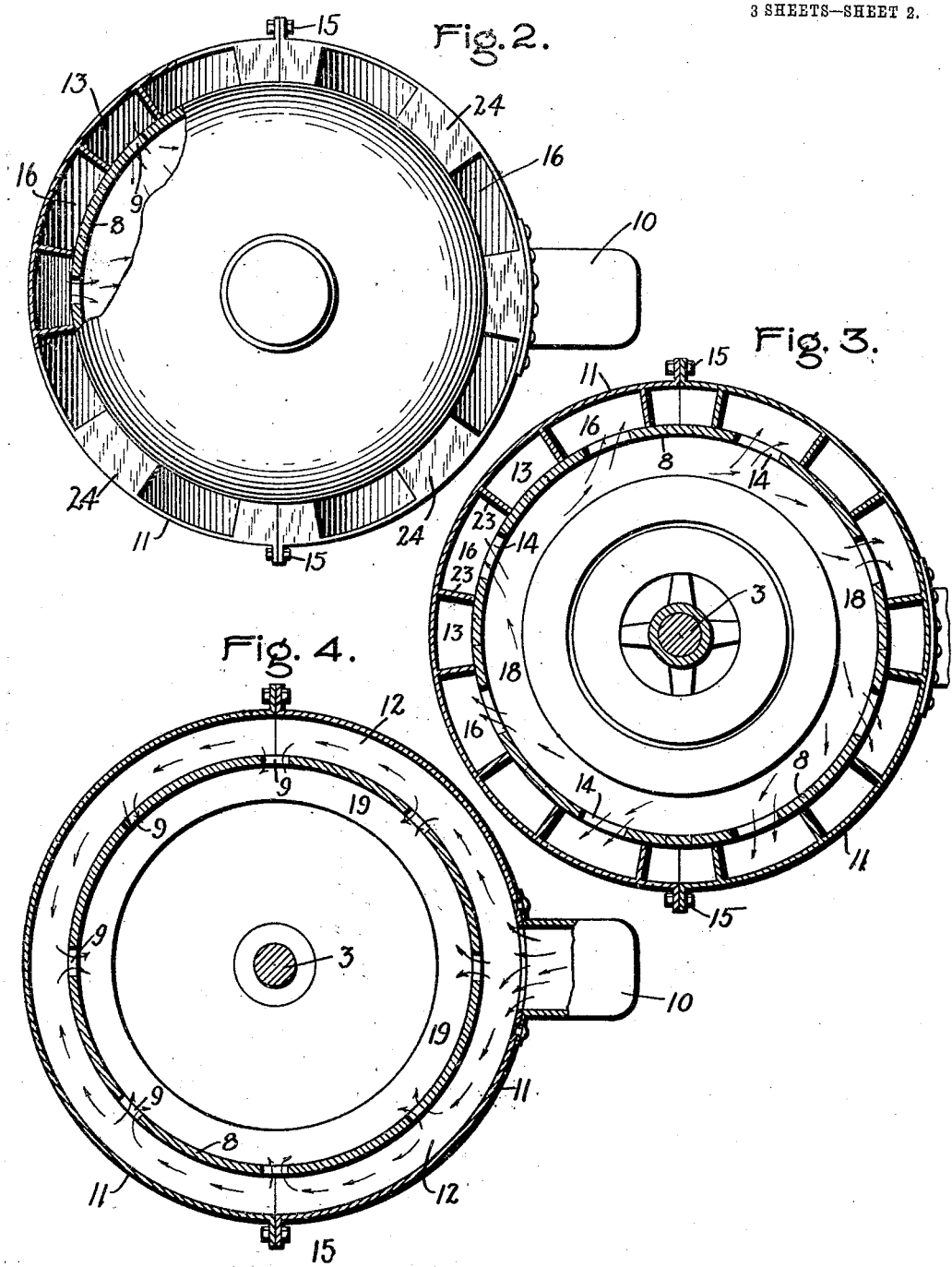

No. 895,894. PATENTED AUG. 11, 1908.
R. H. RICE.
MEANS FOR COOLING DYNAMO ELECTRIC MACHINES.
APPLICATION FILED NOV. 2, 1907.
3 SHEETS—SHEET 3.
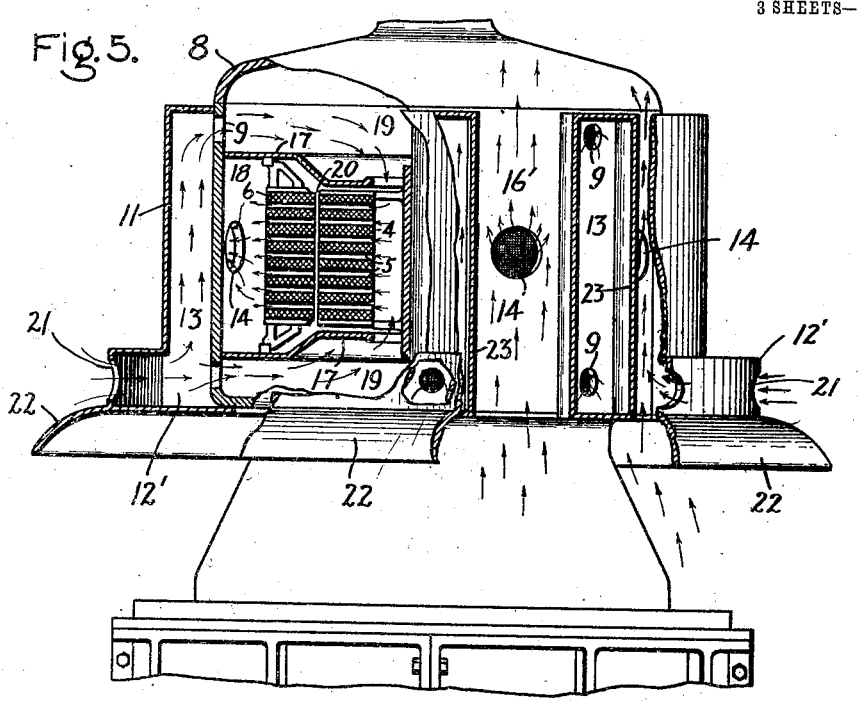
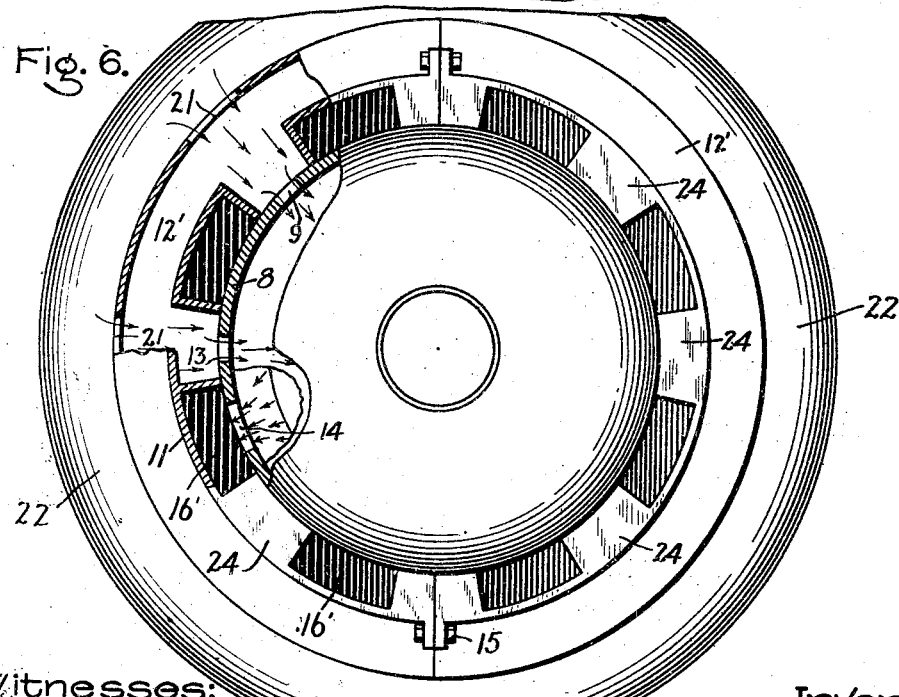
Witnesses:
Lloyd C. Bush
J. Ellis Glen
Inventor,
Richard H. Rice,
By Albert G. Davis
Att'y

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

MEANS FOR COOLING DYNAMO-ELECTRIC MACHINES.

No. 895,894.  Specification of Letters Patent.  Patented Aug. 11, 1908.

Application filed November 2, 1907. Serial No. 400,397.

*To all whom it may concern:*

Be it known that I, RICHARD H. RICE, a citizen of the United States, residing at Lynn, in the county of Essex and State of Massachusetts, have invented certain new and useful Improvements in Means for Cooling Dynamo-Electric Machines, of which the following is a specification.

My invention relates to dynamo-electric machines and has for its object to provide improved means for cooling such machines.

The cooling of turbo-generators especially those of the vertical type presents great difficulties because of radiation and convection of the heat from the turbine which is placed beneath the generator. One advantage of my invention is that this convection of heat may be utilized to assist the ventilation of the generator.

To the above end my invention consists in certain novel features of construction and arrangement of parts, which will be pointed out with particularity in the claims appended to and forming a part of this specification. For a better understanding of my invention, however, reference may be had to the following detailed description taken in connection with the accompanying drawing, in which Figure 1 is an elevation of a generator, embodying my invention, mounted on a turbine, with parts of the generator broken away and in section showing the interior construction; Fig. 2 is a plan view of the generator shown in Fig. 1 partly broken away and in section; Fig. 3 is a section on the line 3 3 of Fig. 1; Fig. 4 is a section on the line 4 4 of Fig. 1; Fig. 5 shows an elevation of a generator, with parts broken away and in section, and embodies a modified form of my invention, and Fig. 6 shows a plan view of the generator of Fig. 5.

Similar reference numerals will be used throughout the specification and the several figures of the drawing to indicate like parts.

The generator in connection with which I have chosen to illustrate my invention is a turbo-alternator which has a revolving field with a distributed winding and a stationary armature, also with a distributed winding. The generator is mounted on the turbine 1, which rests on a base 2. On the shaft 3 are mounted the field laminations 4, which have ventilating ducts 5 therein. The stationary armature has similar laminations 6 with ducts 7. For the sake of clearness, the windings have been omitted from the drawing.

The inner casing 8, surrounding the generator, has inlet openings 9 at the top and bottom. An inlet pipe 10 communicates with an annular chamber or ring-shaped pipe 12 which surrounds the lower part of the inner casing. An outer casing 11 surrounds the inner casing 8, and there are formed vertical ducts 13 and 16 between the two casings by means of partitions 23. This outer casing may also be extended so as to form the outside of the pipe. The inlet ducts 13 communicate at their bottom end with the pipe 12 and are closed at the top by portions 24 of the outer casing which have been bent over, or in any other suitable manner. The outer casing is preferably made in halves and fastened together by bolts 15. The inlet openings 9 communicate with this ring-shaped pipe and also with the vertical ducts 13. The inner casing 8 has outlet holes 14, which are located substantially in the center-line thereof. These outlet holes communicate with the vertical outlet ducts 16, which are surrounded by the outer casing 11 but are open to the atmosphere at the top but may be closed at the bottom by the top of the pipe 12. These outlet ducts 16 alternate about the casing with the inclosed inlet ducts 13. Two plates 17 are placed within the casing 8 so as to close the space 18 against the spaces 19, whereby the space 18 is made an outlet chamber and the space 19 an inlet chamber. These plates have round holes in them so as to leave a means for communication with the inner periphery of the rotor laminations. These plates 17, however, need only close the outlet chamber 18 and may allow communication between the inlet chambers 19 and the air gap 20 between the rotor and stator, by means of perforations, or by having a hole of large diameter.

The flow of the cooling air is in the direction of the arrows. Referring particularly to Figs. 1 to 4 inclusive, the air is forced through the inlet pipe 10, into the ring-shaped pipe 12, into the vertical inlet ducts 13, through the inlet holes 9 in the casing 8, and into the inlet chambers 19. It then passes through the ducts 5 in the field laminations, across the air gap 20 into the ducts 7 of the armature laminations, then into the outlet chamber 18, through the outlet holes 14, into the vertical outlet ducts 16 where it flows upwards because of its high temperature, due to its having cooled the laminations and windings. The heated air from the turbine passes the open end of these outlet ducts 16 and assists materially in the convection of the hot air from the generator. In case the plates 17 admitted the air into the air gap, the field laminations 4 would have much less air passing through them.

In the modification shown in Figs. 5 and 6, air is admitted around the entire periphery of the ring-shaped pipe 12', through openings 21. In this construction an umbrella-shaped hood 22 at the bottom of the armature casing catches the warm air rising from the turbine. The vertical outlet ducts 16' are not closed at the bottom, but instead holes in the hood communicate with them so that the warm air after being caught by the hood passes upward through these outlet ducts 16', as does also the heated air from the generator which passes out through the holes 14 in the inner casing. The convection of the warm air from the turbine assists materially in drawing the heated air out of the outlet chamber 18, while the cold air coming from above the umbrella-shaped hood is not contaminated with the hot air and thus gives the maximum cooling effect allowed by the room temperature.

The outlet ducts may be entirely dispensed with, the inlet ducts carrying the cooling air into the machine, and the heated air discharging into the room through openings or holes 14. In such an arrangement, the heated air would pass upward, due to its own temperature being higher than that of the surrounding air. If the umbrella-shaped hood were used without any outlet ducts either in connection with a ring-shaped pipe as shown in Fig. 1, or as shown in Fig. 5, the holes in the hood would be directly below, or in other words, in line with the discharge openings 14 and the heated air caught by the hood would discharge through the holes therein and assist the convection from the discharge openings.

I have illustrated my invention in its preferred form as being particularly applicable to a vertical turbo-generator of a certain type, but it is well known to those skilled in the art that my invention is applicable to any type of generator, and consequently I do not wish to have my claims limited to the specific structure shown.

What I claim as new and desire to secure by Letters Patent of the United States, is,

1. Means for cooling a dynamo-electric machine, comprising an inner casing having inlet and outlet holes, an outer casing forming inlet and outlet ducts, said inlet and outlet holes communicating with said inlet and outlet ducts, respectively.

2. Means for cooling a dynamo-electric machine, comprising an inner casing, a plate within said inner casing forming inlet and outlet chambers, an outer casing forming inlet and outlet ducts, said inlet and outlet ducts communicating with said inlet and outlet chambers, respectively.

3. Means for cooling a dynamo-electric machine, comprising an inner casing having inlet and outlet chambers formed therein, an outer casing forming inlet and outlet ducts, said inlet duct communicating with said inlet chamber, and said outlet chamber communicating with said outlet duct.

4. Means for cooling a dynamo-electric machine, comprising an inner casing, inlet and outlet chambers formed therein, an outer casing forming inlet and outlet ducts, said inlet and outlet ducts alternating with each other, said inlet ducts communicating with said inlet chamber, and said outlet ducts communicating with said outlet chamber.

5. Means for cooling a dynamo-electric machine, comprising an inner casing having inlet and outlet chambers formed therein, an outer casing forming alternately inlet and outlet ducts, a ring-shaped pipe formed about said inner casing, said inlet ducts communicating with said pipe and also with said inlet chamber, and said outlet ducts being open at one end thereof and communicating with said outlet chamber.

6. Means for cooling a dynamo-electric machine, comprising an inner casing having inlet and outlet chambers formed therein, an outer casing forming inlet and outlet ducts, a ring-shaped pipe about said inner casing communicating with cool air, said inlet ducts communicating with said pipe and also with said inlet chamber, and said outlet ducts being open at one end thereof and communicating with said outlet chamber.

7. Means for cooling dynamo-electric machines, comprising a casing having inlet and outlet chambers formed therein, inlet ducts formed about said casing communicating with said inlet chamber, and discharge openings for the outlet chamber.

8. Means for cooling a dynamo-electric machine, comprising a casing having inlet and outlet chambers formed therein, inlet ducts formed about said casing communicating with said inlet chambers, a ring-shaped pipe about the dynamo-electric machine communicating with the inlet ducts, and discharge openings for the outlet chamber.

9. Means for cooling a dynamo-electric machine, comprising a casing having inlet and outlet chambers formed therein, inlet ducts formed about said casing communicating with said inlet chamber, a ring-shaped pipe about the dynamo-electric machine communicating with the inlet ducts and through which cooling air is admitted, and discharge openings for the outlet chambers.

10. Means for cooling a dynamo-electric machine, comprising a casing having inlet and outlet chambers formed therein, inlet ducts formed about said casing communicating with said inlet chamber, a ring-shaped pipe about the dynamo-electric machine communicating with the inlet ducts, discharge openings for said outlet chambers, and means for forcing cooling air into said pipe.

11. Means for cooling a dynamo-electric machine having a stationary member, comprising an inner casing forming an outlet chamber about the stationary member of the dynamo-electric machine, and separate inlet chambers formed at the ends of the stationary member, an outer casing forming inlet ducts, a ring-shaped pipe about said inner casing communicating with the inlet ducts and through which cooling air is admitted, said inlet chambers communicating with the said inlet ducts, and discharge openings for said outlet chamber.

12. Means for cooling a dynamo-electric machine having a stationary member, comprising an inner casing having inlet and outlet chambers formed therein, an outer casing forming inlet ducts, a ring-shaped pipe about the dynamo-electric machine and communicating with the inlet ducts, said inlet chamber communicating with the said inlet ducts, discharge openings for said outlet chamber, and means for forcing cooling air into said pipe.

13. Means for cooling a vertical dynamo-electric machine, comprising a casing having inlet and outlet chambers formed therein, inlet ducts formed about said casing communicating with said inlet chambers, a ring-shaped pipe about the dynamo-electric machine communicating with the inlet ducts, discharge openings for the outlet chamber, and an umbrella-shaped hood about said dynamo-electric machine near its bottom end having holes in line with said discharge openings.

14. Means for cooling a vertical dynamo-electric machine, comprising an inner casing having inlet and outlet chambers formed therein, an outer casing forming inlet and outlet ducts, said inlet and outlet ducts communicating with said inlet and outlet chambers respectively, and an umbrella-shaped hood about said dynamo-electric machine near its bottom end having holes communicating with said outlet ducts.

In witness whereof, I have hereunto set my hand this thirty first day of October, 1907.

RICHARD H. RICE.

Witnesses:
JOHN A. MCMANUS, Jr.,
PHILIP F. HARRINGTON.